July 27, 1926.
C. H. H. RODANET
1,594,109
OPERATING AND LOCKING DEVICE FOR PIVOTING PANELS
Filed March 26, 1925
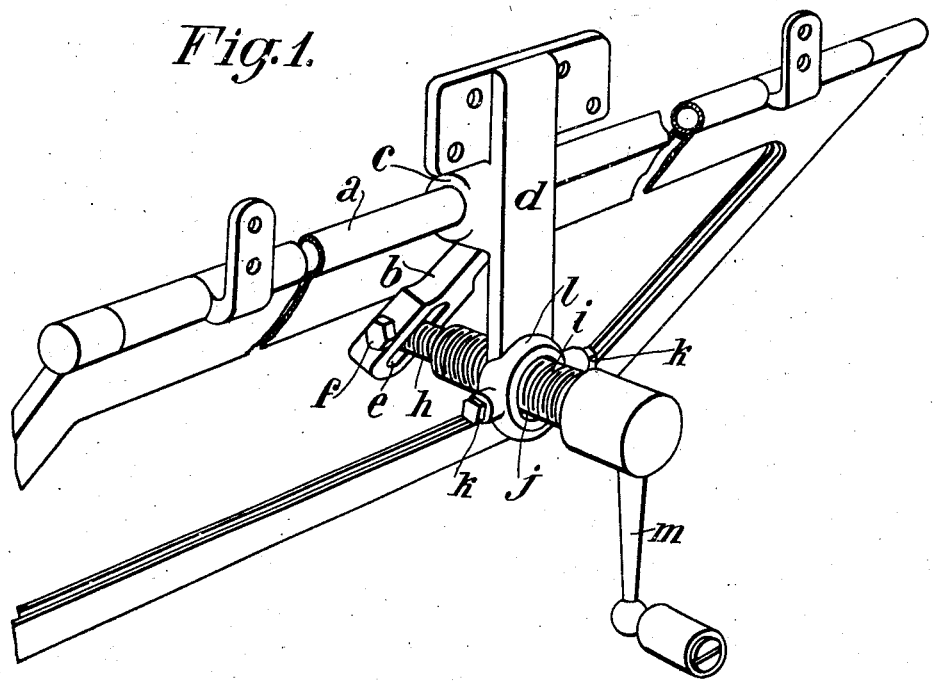
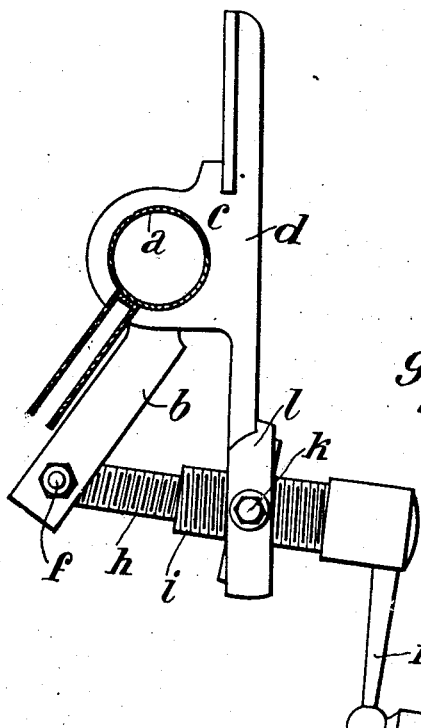
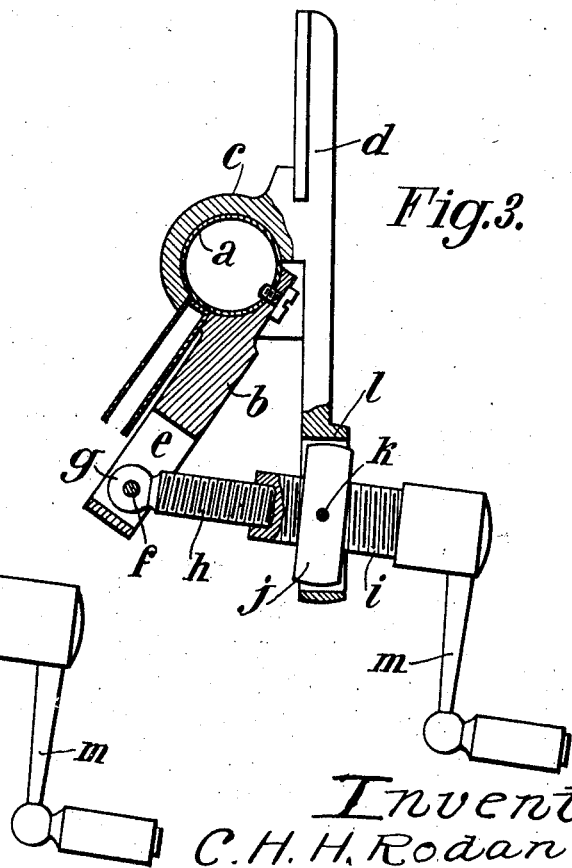
Inventor
C. H. H. Rodanet,
By Marks & Clerk
Attys.

Patented July 27, 1926.

1,594,109

UNITED STATES PATENT OFFICE.

CHARLES HILAIRE HENRI RODANET, OF PARIS, FRANCE, ASSIGNOR TO CHARLES TORRES WEYMANN, OF PARIS, FRANCE.

OPERATING AND LOCKING DEVICE FOR PIVOTING PANELS.

Application filed March 26, 1925, Serial No. 18,636, and in France March 31, 1924.

It has already been proposed, for effecting the angular displacements and locking in position of pivoting panels (such as the frames of the panes or glasses of wind screens for motor vehicles for instance), to centrally arrange, between the said panel and its support a mechanism for transmission of movement by worm and worm wheel. As the worm wheel is arranged on one of the sides of the panel, it results therefrom that the leverage which must produce the angular displacement is very short, since its length is that of the radius of the said wheel. The operation is, consequently, very laborious. Moreover, the screw threads of the worm and of the wheel wear off, so that the device becomes loose or takes some play, the locking in position of the panel is no longer absolute and the latter is subjected to displacements which determine shocks on the worm and worm wheel device, thus further increasing its deterioration.

The present invention includes an operating and locking device for pivoting panels, which remedies the above mentioned inconveniences. For that purpose, the pivoting panel is integral with a lever which can be angularly moved by a worm threaded in a bearing mounted on the support of the said panel. In these conditions, a very supple drive is obtained as well as displacements reduced as desired and an absolute locking of the panel, whatever may be the position it occupies.

In the accompanying drawing:—

Fig. 1 is a perspective view of a form of construction of the device forming the subject-matter of the invention in its application to a wind screen for motor vehicle.

Figs. 2 and 3 are an external view and a vertical section of the said device.

As indicated in the foregoing, the tube $a$ of the wind screen is connected to a lever $b$, this tube $a$ being supported by a fork piece $c$ belonging to the central support $d$. This lever $b$ is provided with an oblong opening $e$ in which is pivoted, on a transverse axis $f$, the eye $g$ terminating a screw $h$. The latter fits a screw threaded bore of another screw $i$, the nut of which is constituted by a ring $j$. The latter is pivoted, according to a diameter, on two trunnions $k$ carried by a stay $l$ integral with the support $d$ of the wind screen.

The screw $i$ carries an operating crank $m$.

The screws $h$ and $i$ are left and right-handed and their pitches are different so as to constitute a differential system.

It will therefore be seen that:—

(a) The system of differential screws $h$, $i$, constitutes a speed reducing drive which acts, for producing the variations of inclination of the wind screen, on a lever $b$ of any length. A very supple drive is thus obtained and the inclination of the wind screen can be adjusted with precision.

(b) Owing to the number of screw threads in contact, the wear and the stresses acting on the same are reduced, so that a positive locking of the wind screen is obtained in the position where it has been placed.

It is obvious that according to circumstances, the lever $b$ can be placed above or below the pivoting axis of the movable panel. In the same way, the side of variable length, of the variable triangle having for the two sides of constant length, the support $d$ and the lever $b$, might be constituted by a single screw pivoting, on the the lever $b$ and moving in the ring $j$ acting as a nut.

What I claim as my invention and desire to secure by Letters Patent is:—

1. In a system for operating and locking rocking panels comprising an extensible system of telescopic screws, a pivoting nut, fixed in rotation, for the outer screw, and means for imparting to the latter a movement of rotation about its axis.

2. In a system for operating and locking rocking panels comprising an extensible system of telescopic screws, a fixed frame, pivots on the said frame, a nut diametrically pivoted between the said pivots and fixed in rotation, a screw passing through the said nut, and means for imparting to the said screw a movement of rotation about its axis.

3. In a system for operating and locking rocking panels comprising an extensible system of telescopic screws, a frame carrying the joint of the panel, pivots on the said fixed frame, a nut, fixed in rotation, diametrically pivoting between the said pivots, a screw passing through the said nut, an operating handle rigidly secured on the said screw for imparting to the latter a movement of rotation about its axis.

In testimony whereof I have signed my name to this specification.

CHARLES HILAIRE HENRI RODANET.